Patented Oct. 27, 1931

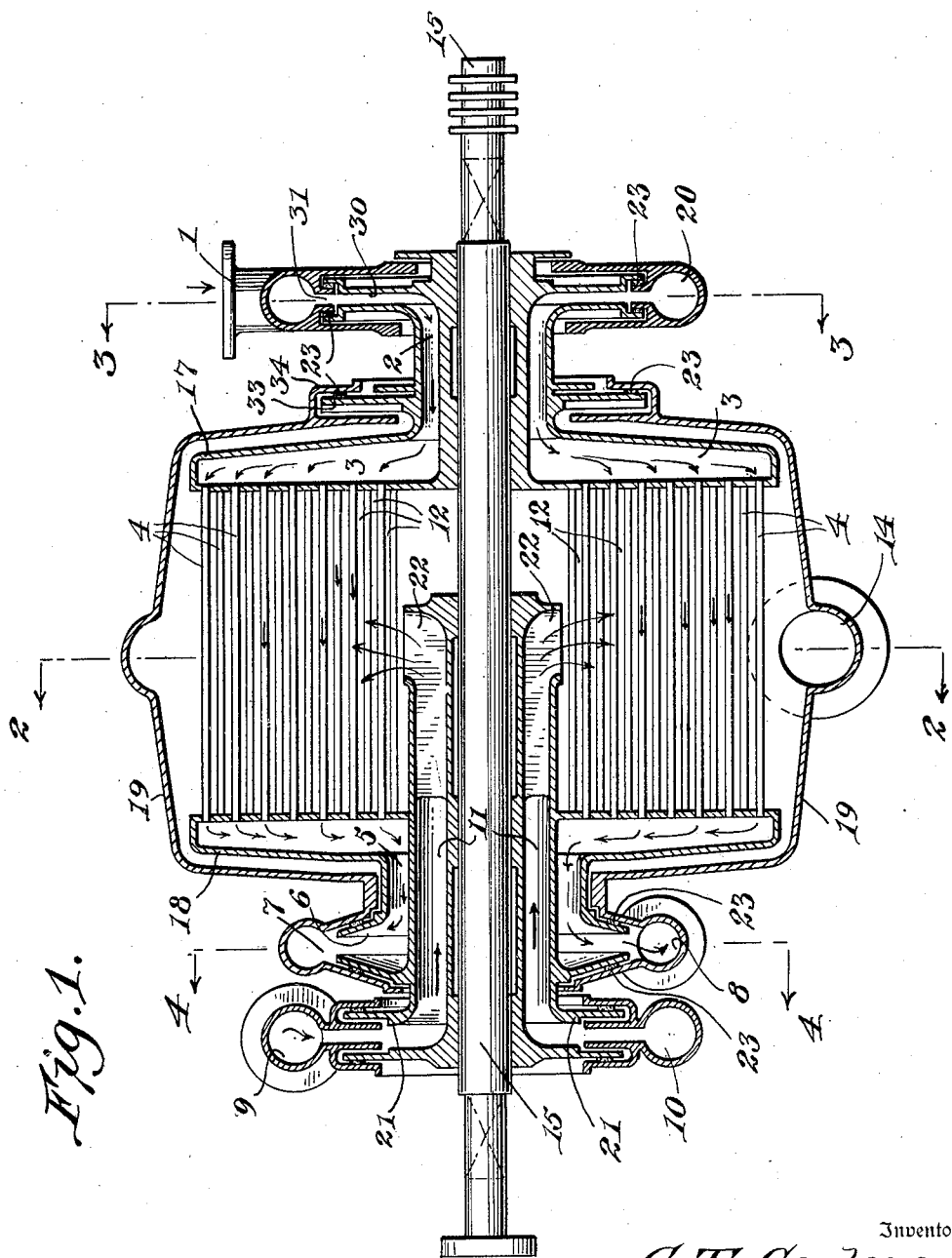

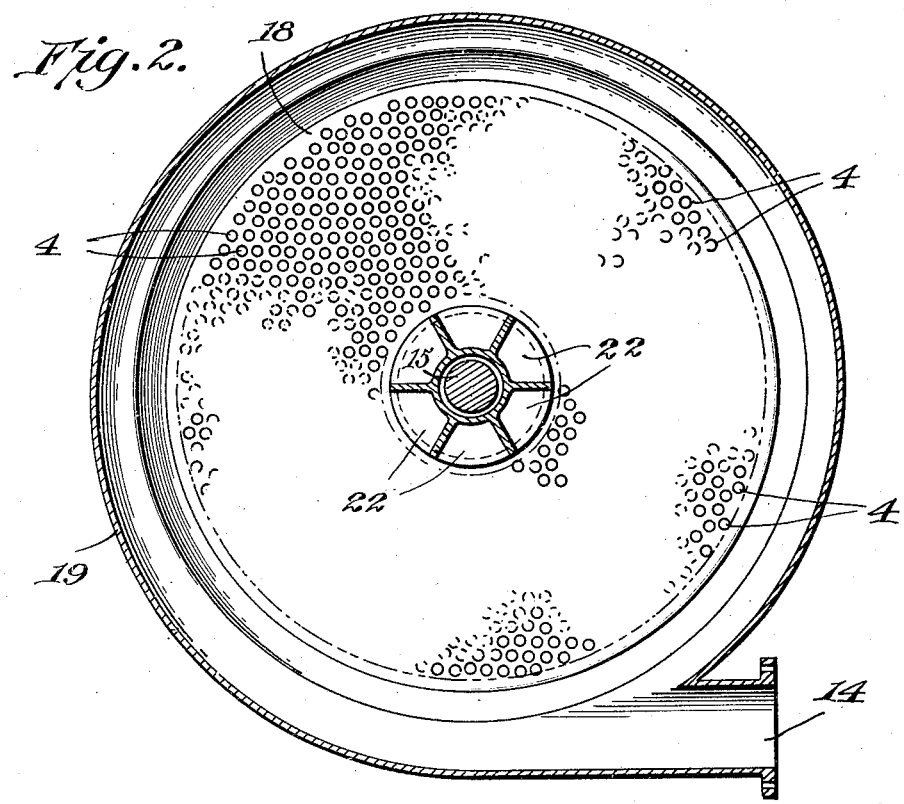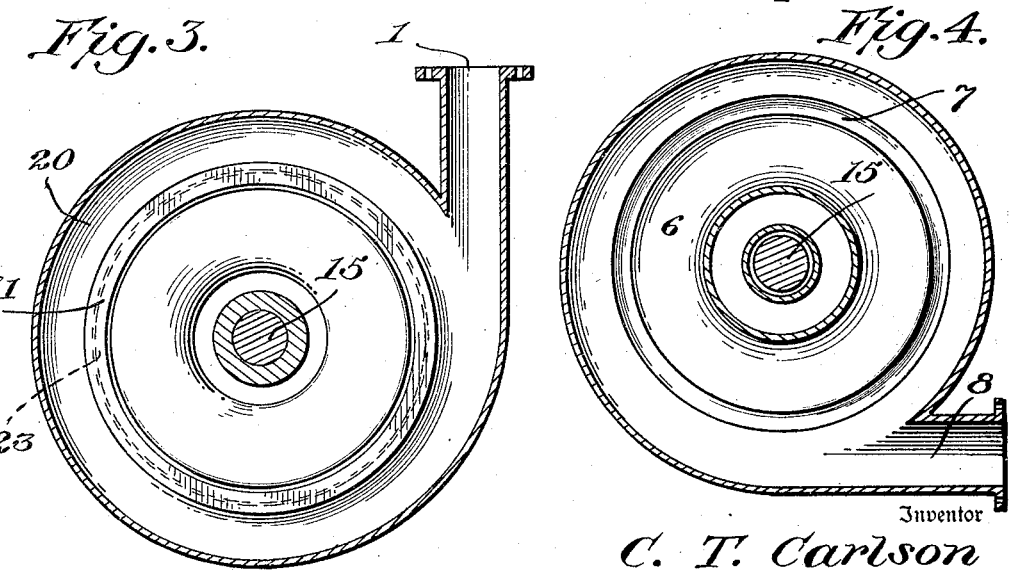

1,828,799

UNITED STATES PATENT OFFICE

CARL THOMAS CARLSON, OF ERIE, PENNSYLVANIA

HEAT EXCHANGER

Application filed March 16, 1931. Serial No. 523,017.

This invention relates to heat exchangers, and particularly to exchangers of the surface condenser type, altho it may be used to heat a fluid where it is desirable.

The principal object of the invention is to increase the efficiency of such condensers or heat exchangers, and this is principally effected by a revolving heating or cooling surface which by centrifugal force throws off the condensation as fast as it is formed, with a resulting increase of the heat transmission.

The apparatus may be used to condense vapor into liquid form by means of another medium which may be either liquid or gaseous.

The vapor to be condensed may be steam such as the exhaust from a steam engine or the like, or it may be vapor evaporated from oil as in the oil industry, or any other vapor capable of being condensed. The cooling medium may be water or air or any other liquid, gas or mixture.

By means of the present invention, instead of the exchanging surface or wall separating the vapor and the cooling medium being stationary, the chamber, pipe or other container enclosing the cooling fluid is caused to rotate so that the condensate will be instantly thrown off of the surface of the container by centrifugal force, and the advantage of such an apparatus is a greatly enlarged capacity for heat exchange and the apparatus consequently can be built in very small and compact units, saving weight, cost and space as compared with apparatus for the same purpose with a stationary condensing surface.

When the vapor condenses on the revolving surface it produces a thin film or coating on said surface, which with stationary apparatus will remain and form an insulating medium, retarding the heat transmission through the cooling wall until it is removed by gravity, whereas by the present invention this thin film or coating will be almost instantly removed by the centrifugal force, thus leaving a dry and cool surface for the vapor, resulting in a very high efficiency.

The invention may be embodied or built in various forms of apparatus, one of which is illustrated in the accompanying drawings, in which Fig. 1 is a longitudinal section of the apparatus. Fig. 2 is a section on the line 2—2 of Fig. 1. Fig. 3 is a section on the line 3—3 of Fig. 1. Fig. 4 is a section on the line 4—4 of Figure 1.

In the drawings, 15 indicates a shaft mounted to rotate in any suitable bearings, and on this shaft are fixed two hollow circular heads 17 and 18 which are connected by a multiplicity of tubes 4. The head 17 is hollow as shown at 3 and is provided with an annular neck 2 which surrounds the shaft and which terminates at its outer end in a hollow circular flange 30 which is adapted to turn in a hollow fixed ring or tube 20 having an inlet 1 and an inner outlet 31 to the hollow flange 30, packing being interposed at 23 between interfitting flanges to make the joint fluid tight while permitting rotation of the inner part.

Similarly the hollow head 18 is provided with an annular neck 5 which ends in a hollow collar or flange 6 which opens into a ring 7 having an outlet 8.

This ring 7 is fixed to or forms part of a fixed casing 19 which encloses the rotary heads and tubes and forms the collecting chamber for the condensate, which has an outlet at 14, at the bottom. Suitable packing 23 is interposed at the joints between the hollow collar 6 and the ring 7, and also between a collar 33 on the neck 2, and a flanged ring 34 on the casing 19, to make fluid tight joints and to permit rotation of the inner parts.

The vapor to be condensed is supplied through an inlet 9 to a fixed ring 10 which is hollow and which surrounds an annular hollow collar 21 at the end of a hollow angular neck 11 which is fixed to the shaft 15 and also to the head 18, and this neck 11 terminates in a vapor outlet 22 leading to the interior of the tubular drum within the casing 19.

In operation the vapor enters through the inlet 9 into the stationary ring 10 from which it passes through the neck 11 and opening 22 into the space 12 surrounding the tubes 4 and the heads 17 and 18. The cooling fluid enters through the inlet 1 to the ring 20 and then through the neck 2, head 17, tubes 4, head 18, neck 5 and out through the collar 6 into the fixed ring 7 and through the outlet 8.

As stated the inner heads and tubes and associated parts are rotated at any desired speed, and the condensate which collects on the surface of the heads and tubes is thrown off into the casing 19 from which it may be drawn off through the outlet 14.

In this way, the advantages of the removal of any adhering film or coat of insulating condensate are attained continually.

It is obvious that the apparatus may have a variety of forms while employing the idea of a revolving heat exchanger having the advantages referred to. Obviously it may be used to heat water or other fluids or gases by means of hot vapors, exposed to the heat exchanging action of a rotary drum or container.

I claim:

1. In a heat exchanger, the combination with a fixed casing having an inlet and an outlet for one fluid, of a revolvable container enclosed therein having an inlet and an outlet for another fluid, and adapted by its revolution to dislodge condensate therefrom by centrifugal force.

2. In a heat exchanger, the combination stated in claim 1, said container comprising opposite heads and tubes between said heads.

3. In a heat exchanger, the combination stated in claim 1, the inlet to and outlet from said container comprising hollow necks extending axially through the casing wall.

4. In a heat exchanger, the combination stated in claim 1, the inlet to and outlet from said container comprising hollow necks extending axially through the casing wall and fixed hollow supply and discharge rings surrounding and communicating with the outer ends of said necks respectively.

5. The combination stated in claim 1, the inlet to said casing comprising a hollow neck extending into the same around the axis of the container and rotatable therewith.

6. In a heat exchanger, the combination stated in claim 1, the inlet to and outlet from said container comprising hollow necks extending axially through the casing wall, the inlet to said casing comprising a hollow neck extending axially through one of the necks of the container.

7. In a condenser in combination, an outer casing having an inlet for vapor and an outlet for condensate, a shaft extending through the same, a container fixed on the shaft within the casing, and inlet and outlet annular necks surrounding said shaft and leading to and from the container, and means to feed fluid to and discharge the same from said necks respectively.

8. The combination stated in claim 7, said means comprising hollow rings surrounding said necks and communicating therewith.

In testimony whereof, I affix my signature.

CARL THOMAS CARLSON.